United States Patent [19]

Mizuhara

[11] Patent Number: 4,780,374

[45] Date of Patent: Oct. 25, 1988

[54] COMPOSITE BRAZING ALLOY FOIL

[75] Inventor: Howard Mizuhara, Hillsborough, Calif.

[73] Assignee: GTE Products Corporation, Stamford, Conn.

[21] Appl. No.: 177,251

[22] Filed: Apr. 4, 1988

[51] Int. Cl.[4] .............................................. B32B 15/00
[52] U.S. Cl. ................................... 428/660; 428/607; 420/420
[58] Field of Search ................. 428/607, 660; 420/420

[56] References Cited

U.S. PATENT DOCUMENTS

| 3,561,099 | 2/1971 | Mizuhara | 428/660 |
|---|---|---|---|
| 3,652,237 | 3/1972 | Mizuhara | 428/660 |
| 4,029,479 | 6/1977 | Parker | 428/660 |
| 4,624,897 | 11/1986 | Ito | 428/660 |
| 4,725,509 | 2/1988 | Ryan | 428/660 |

FOREIGN PATENT DOCUMENTS 0419344  3/1974  U.S.S.R. ............................... 420/420

Primary Examiner—L. Dewayne Rutledge
Assistant Examiner—David Schumaker
Attorney, Agent, or Firm—James Theodosopoulos

[57]  ABSTRACT

A malleable composite brazing alloy comprises a pair of outer layers formed of a titanium-aluminum-vanadium alloy and an inner layer formed of a copper-nickel alloy, the layers being bonded to each other by rolling.

7 Claims, No Drawings

COMPOSITE BRAZING ALLOY FOIL

This invention concerns a composite brazing alloy containing titanium, copper and nickel, such as is disclosed in U.S. Pat. Nos. 3,561,099 and 3,652,237, the disclosures of which are incorporated herein by reference. The brazing alloys disclosed therein comprise a pair of outer layers of titanium bonded to an inner layer therebetween of copper and nickel.

The purpose of such a construction is to provide a physically bonded, but non-alloyed, malleable assembly which can be subsequently metal worked, all as pointed out at column 1, lines 50–63 of U.S. Pat. No. 3,561,099. The titanium, copper and nickel, if bulk alloyed, would not provide a malleable material.

However, a problem with the titanium, copper, nickel filler metal assembly can occur when it is used to braze, say, Ti6Al4V metals, which are metals having a composition, in weight percent, of 90% titanium, 6% aluminum, 4% vanadium. At brazing, the chemical balance of the metals at the brazed joint could be upset, which could result in a problem with galvanic corrosion.

This invention provides a composite braze alloy that reduces or minimizes such galvanic corrosion. The composite braze alloy comprises a pair of outer layers of a titanium-aluminum-vanadium alloy and an inner layer of a copper-nickel alloy, the outer layers being bonded to the inner layer. The composite braze alloy is made by disposing a sheet of copper-nickel alloy of predetermined thickness between two sheets of titanium-aluminum-vanadium (TiAlV) alloy slightly larger in size so that the TiAlV sheets could be welded to each other around their entire periphery. The composite is then rolled down to a foil of desired thickness, say, 2 mils, during which rolling operation there is diffusion bonding of the layers to each other. In one example, the two initial outer sheets comprised 32 mil thick Ti64 alloy (90% Ti, 6% Al, 4% V) and the inner sheet comprised 20 mil thick 50% Cu-50% Ni alloy. The final rolled thickness of the foil was 5 mils.

The following table shows compositions within this invention on which Differential Thermal Analysis was performed in order to determine solidus and liquidus temperatures, which are reported in °C. Alloy composition is reported in weight percent.

TABLE 1

| Sample | Ti64 | Ti | Al | V | Cu | Ni | Sol | Liq |
|---|---|---|---|---|---|---|---|---|
| A | 65 | 58.5 | 3.9 | 2.6 | 10 | 25 | 875 | 955 |
| B | 60 | 54.0 | 3.6 | 2.4 | 20 | 20 | 875 | 930 |
| C | 65 | 58.5 | 3.9 | 2.6 | 15 | 20 | 875 | 905 |
| D | 70 | 63.0 | 4.2 | 2.8 | 10 | 20 | 890 | 1075 |
| E | 60 | 54.0 | 3.6 | 2.4 | 25 | 15 | 880 | 915 |
| F | 60 | 54.0 | 3.6 | 2.4 | 15 | 25 | 870 | 910 |
| G | 55 | 49.5 | 3.3 | 2.2 | 25 | 20 | 875 | 905 |
| H | 55 | 49.5 | 3.3 | 2.2 | 20 | 25 | 870 | 910 |
| I | 65 | 58.5 | 3.9 | 2.6 | 20 | 14 | 875 | 907 |
| J | 70 | 63.0 | 4.2 | 2.8 | 20 | 10 | 887 | 1051 |
| K | 60 | 54.0 | 3.6 | 2.4 | 10 | 30 | 883 | 920 |
| M | 70 | 63.0 | 4.2 | 2.8 | 15 | 15 | 865 | 1055 |
| N | 75 | 67.5 | 4.5 | 3.0 | 12.5 | 12.5 | 860 | 1075 |

Composite brazing alloys within this invention that are suitable for brazing to Ti64 alloys have the following total composition, by weight: 36–81% titanium; 1–8% aluminum; 1–6% vanadium; 5–30% nickel; 5–30% copper. Specific examples that produced satisfactory brazes on the titanium-aluminum-vanadium alloy were as follows.

Example 1. 70% Ti6Al4V, 15% Ni, 15% Cu.
Example 2. 60% Ti6Al4V, 20% Ni, 20% Cu.
Example 3. 60% Ti6Al4V, 25% Ni, 15% Cu.
Example 4. 75% Ti6Al4V, 12.5% Ni, 12.5% Cu.

I claim:

1. A malleable brazing alloy composite foil comprising a pair of outer layers formed of a titanium-aluminum-vanadium alloy and an inner layer formed of a copper-nickel alloy, the layers being bonded to each other by rolling.

2. The brazing alloy composite foil of claim 1 having the following total composition, by weight: 36–81% Ti, 1–8% Al; 1–6% V; 5–30% Ni; 5–30% Cu.

3. The brazing alloy composite foil of claim 1 wherein the titanium-aluminum-vanadium alloy has the following composition by weight: Ti-6Al-4V.

4. The brazing alloy composite foil of claim 3 having the following total composition by weight: 70% (Ti-6Al-4V); 30% (Ni-50Cu).

5. The brazing alloy composite foil of claim 3 having the following total composition by weight: 60% (Ti-6Al-4V); 40% (N-50Cu).

6. The brazing alloy composite foil of claim 3 having the following total composition by weight: 60% (Ti-6Al-4V); 40% (N-37.5 Cu).

7. The brazing alloy composite foil of claim 3 having the following total composition by weight 75% (Ti-6Al-4V); 25% (Ni-50Cu).

* * * * *